United States Patent

Frötschner et al.

[11] 3,986,356
[45] Oct. 19, 1976

[54] HYDRODYNAMIC TORQUE CONVERTER FOR VEHICLES, ESPECIALLY FOR MOTOR VEHICLES

[75] Inventors: Eberhard Frötschner, Gerlingen; Hans Merkle, Stuttgart, both of Germany

[73] Assignee: Daimler-Benz Aktiengesellschaft, Germany

[22] Filed: Feb. 6, 1976

[21] Appl. No.: 656,067

[30] Foreign Application Priority Data

Feb. 7, 1975 Germany............................ 2505092

[52] U.S. Cl................................... 60/342; 60/352; 60/355; 60/362; 415/160
[51] Int. Cl.²........................................ F16D 33/00
[58] Field of Search............. 60/342, 347, 352, 354, 60/355, 356, 361, 362, 367; 415/134, 141, 146, 147, 160; 416/144, 180

[56] References Cited

UNITED STATES PATENTS

| | | | |
|---|---|---|---|
| 2,173,604 | 9/1939 | Dodge | 60/362 X |
| 2,909,034 | 10/1959 | Jandasek | 60/342 |
| 3,014,430 | 12/1961 | Schneider | 416/180 |
| 3,934,414 | 1/1976 | Merkle et al. | 60/342 |

*Primary Examiner*—Edgar W. Geoghegan
*Attorney, Agent, or Firm*—Craig & Antonelli

[57] ABSTRACT

A hydrodynamic torque converter for vehicles, particularly for passenger motor vehicles, with at least one pump wheel, one turbine wheel and one guide wheel supported on a free-wheeling device, in which the guide blades are automatically adjustable, when the guide wheel rotates, in dependence on the centrifugal force in the sense of a cascade opening with an increasing rotational speed.

14 Claims, 3 Drawing Figures

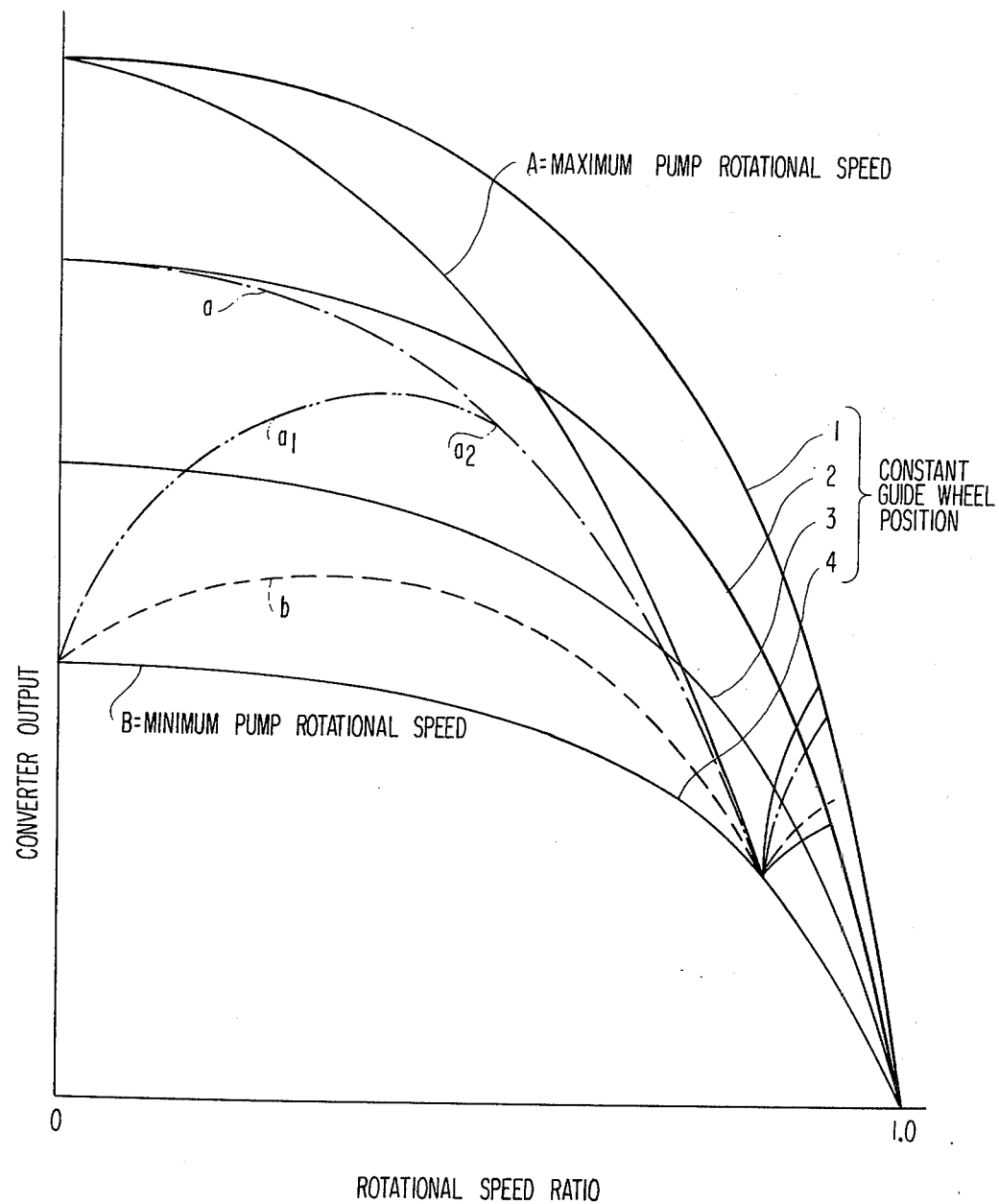

HYDRODYNAMIC TORQUE CONVERTER FOR VEHICLES, ESPECIALLY FOR MOTOR VEHICLES

The present invention relates to a hydrodynamic torque converter for vehicles, especially for motor vehicles, with a pump wheel, a turbine wheel and a guide wheel supported on a free-wheeling device, paticularly with a blade cascade automatically adjustable in the opening direction by the circulating flow against a spring force.

Hydrodynamic torque converters are used to an increasing extent in the drive connection, especially in motor vehicles. They fulfill in the most far-reaching manner the requirement for a stepless conversion of the engine output into driving output for the vehicle. So called Trilok torque converters are thereby used primarily. These Trilok converters consist normally of a centrifugal pump, of a centripetal turbine and of a guide wheel which is provided with a free-wheeling device. Converters of this type have essentially a characteristic curve which is independent of the input rotational speed. However, reasons may exist, partly for a further improvement of the transmission properties, partly for reasons of special applications, which make it necesary to change in a desired manner the performance or output figure that is dependent only on the rotational speed ratio, by interengagements from the outside. Thus, for example, high starting rotational speeds at full load are not desired by reason of the hydraulic losses connected therewith, by reason of the possibly strongly increasing engine noises and by reason of the high fuel consumption while simultaneously therewith small converter performance or output figures result in that case in the coupling range which also leads to larger losses when driving in this range since one has to operate with larger slippage. Lower starting rotational speeds for full load, in contrast thereto, signify high creep moments during idling rotational speeds which may become dangerous, for example, when braking on icy or slippery roads.

One therefore aims to expand the torque converter range determinative for the improvement of the driving output—that is, the operating range between starting point and coupling point—over as large as possible an output rotational speed range. For that purpose it was already proposed heretofore (German Patent Application P 23 50 600.5) to automatically adjust the rotatably arranged guide blades by the torque exerted by circulating flow in opposition to a spring force.

The present invention is now concerned with the task to impart onto the torque converter a smaller slippage and therewith a better efficiency in the coupling range. The present invention thereby starts with the previously proposed guide blade adjustment, even though it is to be understood that the present invention is not limited thereto. The posed task is solved according to the present invention in that with a rotating guide wheel, the guide wheel blades are automatically adjustable in dependence on the centrifugal force in the sense of an opening blade cascade opening with increasing rotational speed.

In a torque converter constructed according to the present invention, the blade cascade at the guide wheel opens in an advantageous manner more or less within the coupling range. As a result thereof, the torque converter now operates in this range with smaller slippage and therefore with better efficiency.

The present invention prefers a solution, according to which the adjusting mechanism dependent on the centrifugal force is arranged in the converter core ring. This, of course, does not preclude that in special cases this adjusting mechanism might also be accommodated in the hub. Additionally, it is also desirable according to the present invention that the inlet and outlet angles of pump, turbine and guide wheel blades are so matched to one another that the converter efficiency and the attainable coupling point represents an optimum in the guide wheel blade position (end position in the direction of closing of the guide wheel) which adjusts itself in that connection.

In particular, it is proposed for a preferred embodiment according to the present invention that the pivot axes of the guide wheel blades are extended radially through the guide wheel outer ring which serves simultaneously as support ring for the flyweights or is connected with such a support ring. The construction may thereby be made in such a manner that according to the present invention, several flyweights disposed in the circumferential direction which are supported on axially parallel bolts and are distributed uniformly over the circumference, are supported at the support ring whereby each of the flyweights engages with a radially inwardly directed arm in an adjusting ring having a limited rotatability.

It is thereby without importance whether the arrangement of the flyweights takes place on one side or pair-wise on both sides of the support ring. This will depend primarily on the spatial conditions. A further feature of the present invention resides in the fact that the adjusting ring is provided with recesses or apertures at the inner circumference, into which engage pins which are arranged on the lever arms of the blade pivot shafts.

Accordingly, it is an object of the present invention to provide a hydrodynamic torque converter for vehicles, especially for motor vehicles which avoids by simple means the aforementioned shortcomings and drawbacks encountered in the prior art.

Another object of the present invention resides in a hydrodynamic torque converter for vehicles, which exhibits an improved torque converter range determinative for the driving output.

A further object of the present invention resides in a torque converter for motor vehicles in which the torque converter range between the driving point and coupling point is extended over as large an output rotational speed range as possible.

Still a further object of the present invention resides in a torque converter which has a smaller slippage in the coupling range and therewith produces a better efficiency.

Still another object of the present invention resides in a torque converter for vehicles, especially for motor vehicles, which is simple in construction, yet permits a modification of the performance figure dependent normally only on the rotational speed ratio.

These and other objects, features and advantages of the present invention will become more apparent from the following description when taken in connection with the accompanying drawing which shows, for purposes of illustration only, one embodiment in accordance with the present invention, and wherein:

FIG. 3 is the performance diagram of the torque converter in accordance with the present invention.

Figure 1:
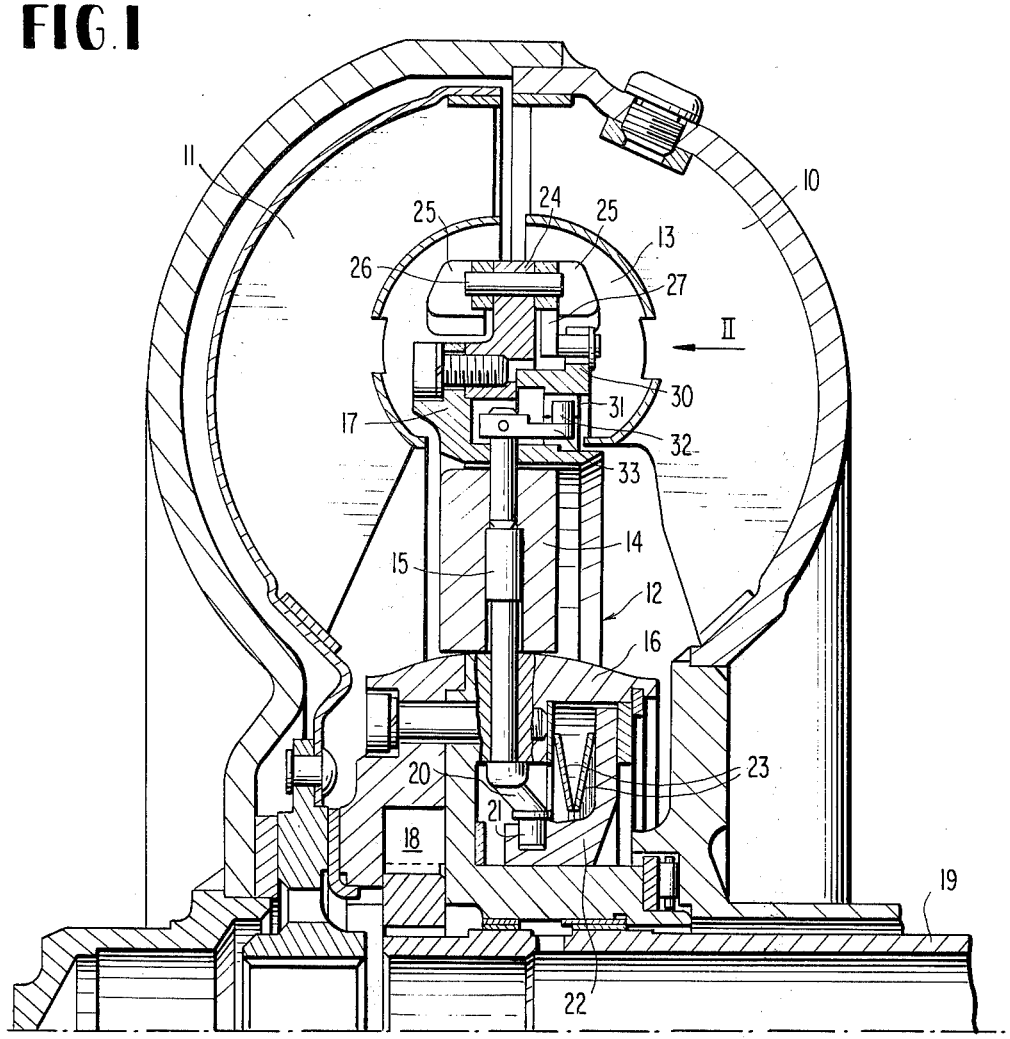
FIG. 1 is a partial axial cross-sectional view through a hydrodynamic torque converter in accordance with the present invention.

Referring now to the drawing wherein like reference numerals are used throughout the various views to designate like parts, according to FIG. 1, the torque converter consists of a pump wheel 10, of a turbine wheel 11 and of a guide wheel generally designated by reference numeral 12. The pump wheel 10 and turbine wheel 11 are provided with inner shells and form in this manner a core ring 13. The guide wheel 12 has rotatable blades 14 whose pivot shafts 15 extend up to into the hub portion 16 and extend outwardly also through the outer ring 17. The entire guide wheel 12 is supported on a hollow pin 19 by means of the hub portion 16 and by way of a free-wheeling device 18, which hollow pin 19 is non-rotatably connected with the transmission housing (not shown).

The pivot shaft 15 of the guide blade 14 is provided at its inner end, i.e., at the end arranged in the hub portion 16, with a lever arm 20 which engages by means of a pin 21 in a guide ring 22. Springs 23 are arranged between the guide ring 22 and the hub portion 16, which seek to rotate the blades 14 into the closed position. The torque produced by the flow acts on the blades 14 which changes with the deflection and with the flow velocity. This torque, by reason of the flow velocity, seeks to open the blades 14 against the force of the springs 23. These are the only torques within the converter range, i.e., with a stationary guide wheel, which act on the blades. In operation the guide blades will always rotate so far until equilibrium is achieved between the flow torque and the spring torque.

In the illustrated torque converter, the flow torque of the guide blades increases with constant input rotational speed from the coupling point to the starting point. Additionally, with increasing input rotational speed the torque again once more increases. The spring force and the flow force are so matched to one another that in the starting point at full load, the guide wheel is open and therewith the converter performance or output figure is large, and in that during idling the guide wheel is nearly closed so that the converter performance or output figure is small and therewith the creep moment is small. During transition from starting point to the coupling point, the flow velocity and the deflection in the guide wheel decreases. The torque acting on the blades which is dependent on flow, therefore decreases and the spring force commences to close the guide wheel up to its equilibrium position.

Figure 2:
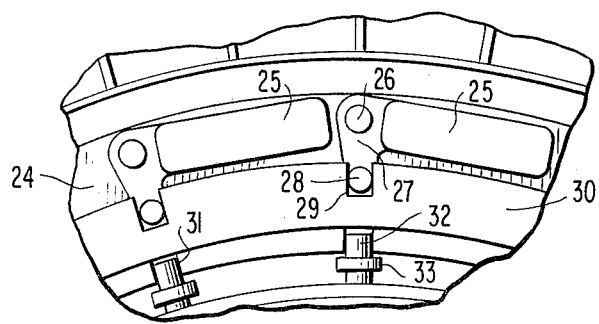
FIG. 2 is a partial elevational view of the torque converter according to FIG. 1, taken in the direction of arrow II.

A further adjusting mechanism is arranged in the core ring 13 of the torque converter which becomes effective in the coupling range, i.e., with a rotating guide wheel. This adjusting mechanism responds to the centrifugal force of the rotating guide wheel. According to FIGS. 1 and 2, a support ring 24 is fastened at the outer ring 17 of the guide wheel, on which are pivotally supported pair-wise on both sides flyweights 25 by means of axially parallel pins 26. The flyweights 25 extend in the circumferential direction. They engage by means of lever arms 27 and pins 28 into cut-outs or recesses 29 of an adjusting ring 30 which is rotatably arranged in the circumferential direction at the support ring 24. The adjusting ring 30, in its turn, includes at the inner circumference, recesses or cut-outs 31 into which engage lever arms 33 by means of pins 32 which are arranged on the pivot shafts 15 of the blades 14. If, therefore, the guide wheel 12 now rotates in the coupling range, then the flyweights 25 deflect more or less outwardly and as a result thereof rotate the adjusting ring 30 (FIG. 2) in the clockwise direction whereby the blades 14 are opened again. As a result thereof, the converter performance or output figure becomes larger again in the coupling range. This has the advantage that the slippage at which the converter operates is smaller and therewith the efficiency becomes better. The torque converter performance figure is no longer independent in this torque converter from the rotational speed.

FIG. 3 illustrates—schematically represented—the characteristic diagram obtainable with these installations according to the present invention. The converter performance figure (ordinate) is plotted as a function of the rotational speed ratio (abscissa). The curves 1 to 4 show the attainable converter performance or output figures respectively with constant guide wheel position. With the curve 1, the guide wheel has an open blade cascade, with the curve 4, a closed blade cascade. The blade shapes of turbine, pump and guide wheel are thereby so matched to one another that good efficiencies exist within frequently driven ranges of the characteristic diagram. This is true especially for the curves 3 and 4 whereas the curves 2 and 1 show already decreasing efficiencies. The curves A and B illustrate the boundary curves which can be achieved with constant maximum or minimum pump rotational speed, i.e., with engine maximum rotational speed and with engine idling rotational speed. The operation now takes place between these two boundary curves. The efficiency of the installation according to the present invention, namely the opening of the cascade at the guide wheel dependent on the centrifugal force within the coupling range can be readily recognized from this diagram. The dash-and-dotted line $a$ can be achieved if one drives with engine full load from the starting point to the maximum vehicle velocity. The also dash-and-dotted line $a1$ results if one starts with engine idling and later on one continues to drive with engine full load. This curve, of course, coincides with the curve $a$ at a point $a2$. Finally, the dash line $b$ illustrates an engine partial load curve whereby again one starts with engine idling speed.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A hydrodynamic torque converter for vehicles, comprising pump wheel means, turbine wheel means and guide wheel means having guide blades and supported on a free-wheeling device, characterized by adjusting means automatically adjusting the guide blades in case of a rotating guide wheel means in dependence on the centrifugal force in the sense of a blade cascade opening with increasing rotational speed.

2. A torque converter according to claim 1, in which the blade cascade of the guide wheel means is automatically adjustable in the opening direction by the circulating flow against a spring force.

3. A torque converter with a core ring according to claim 1, characterized in that the adjusting means includes an adjusting mechanism dependent on centrifugal forces which is arranged in the converter core ring.

4. A torque converter according to claim 3, in which the guide wheel blades include pivot shaft means, said pivot shaft means extending radially through the guide wheel outer ring.

5. A torque converter according to claim 4, characterized in that the guide wheel outer ring serves simultaneously as support ring for the flyweights.

6. A converter according to claim 4, characterized in that the guide wheel outer ring is operatively connected with a support ring for the flyweights.

7. A converter according to claim 4, characterized in that several flyweight means disposed in the circumferential direction on axially parallel bolts and distributed substantially uniformly over the circumference are supported on the support ring means, each flyweight means being provided with a radially inwardly directed arm engaging in a adjusting ring means rotatable within limits.

8. A converter according to claim 7, characterized in that the adjusting ring means is provided at the inner circumference with notches into which engage pins which are arranged on lever arms of the pivot shaft means.

9. A torque converter according to claim 8, in which the blade cascade of the guide wheel means is automatically adjustable in the opening direction by the circulating flow against a spring force.

10. A torque converter according to claim 9, characterized in that the guide wheel outer ring serves simultaneously as support ring for the flyweights.

11. A converter according to claim 9, characterized in that the guide wheel outer ring is operatively connected with a support ring for the flyweights.

12. A converter according to claim 1, characterized in that several flyweight means disposed in the circumferential direction on axially parallel bolts and distributed substantially uniformly over the circumference are supported on a support ring means, each flyweight means being provided with a radially inwardly directed arm engaging in an adjusting ring means rotatable within limits.

13. A converter according to claim 12, characterized in that the adjusting ring means is provided at the inner circumference with notches into which engage pins which are arranged on lever arms of pivot shaft means.

14. A torque converter according to claim 12, in which the guide wheel blades include pivot shaft means, said pivot shaft means extending radially through the guide wheel outer ring.

* * * * *